Nov. 10, 1970     R. J. TOLMIE     3,539,898
CHARGING MEANS FOR ELECTRICAL APPLIANCE
Filed Nov. 4, 1968                            2 Sheets-Sheet 1
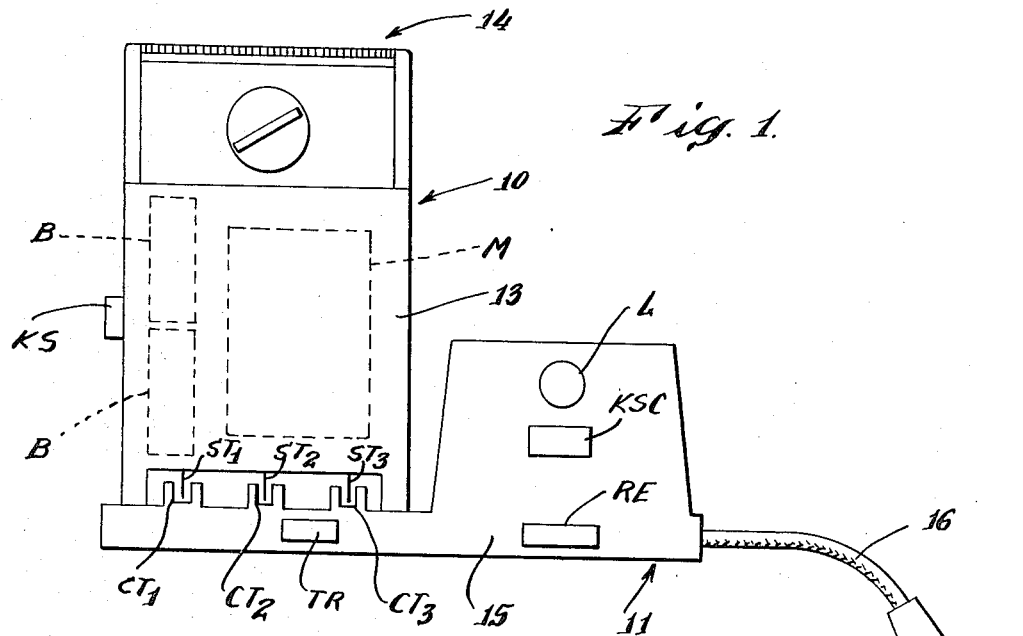
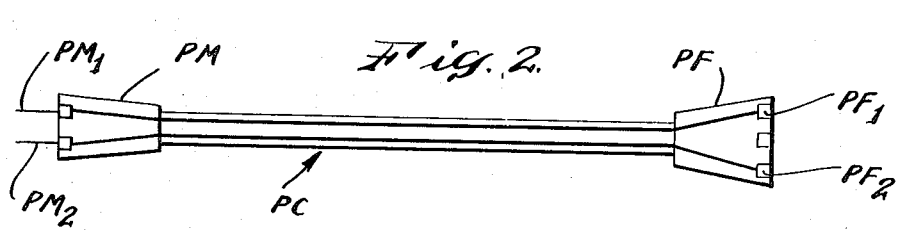
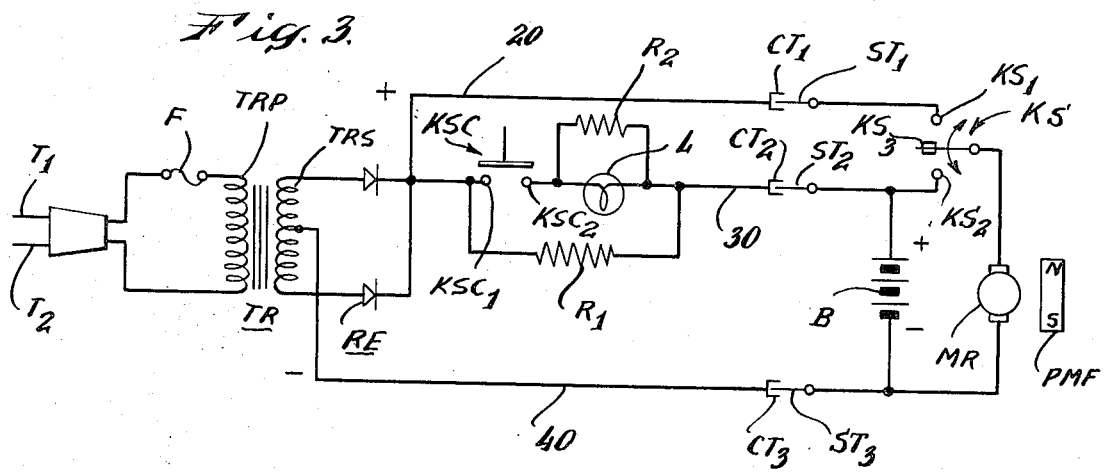
INVENTOR.
Robert J. Tolmie
BY
ATTORNEY.

INVENTOR.
Robert J. Tolmie

ATTORNEY.

United States Patent Office 3,539,898
Patented Nov. 10, 1970

3,539,898
CHARGING MEANS FOR ELECTRICAL APPLIANCE
Robert J. Tolmie, Fairfield, Conn., assignor to Sperry Rand Corporation, New York, N.Y., a corporation of Delaware
Continuation-in-part of application Ser. No. 695,221, Jan. 2, 1968. This application Nov. 4, 1968, Ser. No. 777,977
Int. Cl. H02j 7/00
U.S. Cl. 320—22                                     5 Claims

ABSTRACT OF THE DISCLOSURE

This disclosure is directed to charging means for an electrical portable appliance having a replenishable power supply wherein the charging means include control means operable to selectively vary the magnitude of the applied power at the output of the charging means to vary the rate of charge of the replenishable power supply.

BACKGROUND OF THE INVENTION

This invention relates to new and useful improvements in charging means for electrical appliances having replenishable power supplies and is a continuation-in-part of my copending application Ser. No. 695,221 filed Jan. 2, 1968.

Portable electrical appliances adapted for a wide variety of domestic uses and having replenishable power supplies such as for example, electric dry shavers having self-contained rechargeable batteries are well-known. The latter type devices are provided with charging means either within the shaver casing or in a separate charger stand or the like whereby a circuit may be selectively established between the batteries and the charging means to periodically recharge the batteries to provide proper energization of the appliance motor by the batteries through a battery-motor circuit of the appliance.

Problems have been encountered in presently known battery operated shavers, for example, when the batteries are not sufficiently charged to complete one shaving operation, commonly referred to as a "shave," in that it has been necessary for a person to place the shaver in a battery-charging condition thereby depriving the person of use of the device from the batteries. Known devices of this type usually require a prolonged period of time to recharge the batteries sufficiently to obtain one shave and a longer period to fully recharge the batteries. As a result a person is denied use of battery operation of the appliance for a relatively lengthy period if the batteries are not recharged at regular intervals. It is therefore desirable to provide charging means which permits for recharging of the batteries over a short period of time to provide a sufficient state of charge in the batteries to enable the user to effect at least one complete shave prior to his recharging the batteries for a longer period to fully restore their state of charge.

It is an object of the present invention to provide novel charging means for the replenishable power supply of an electrical appliance.

Another object is to provide charging means wherein novel means are provided for selectively varying the magnitude of the power applied to the replenishable power supply.

Another object is to provide a novel battery charging arrangement for a rechargeable battery operated appliance wherein novel means are provided for selectively varying the magnitude of the applied power to recharge the batteries over varying time periods.

A still further object is to provide novel charging means for a rechargeable battery operated appliance wherein control means are provided to selectively vary the rate of charge of the batteries and which means include means for visually indicating when an increased rate of charge is being effected.

The present invention contemplates novel charging means for an appliance having a replenishable power supply. One embodiment of the novel charging means is provided for use with an electric dry shaver having a motor energized by rechargeable batteries. The charging means are provided with input means for receiving applied alternating current; and power converting means for converting the alternating current to unidirectional power to be applied at output means which are adapted for connection to the replenishable power supply of the appliance. Control means including resistance means is electrically interposed between the converting means and the output means for limiting the magnitude of the unidirectional power applied at the output means and which control means further include means for selectively varying the magnitude of the applied unidirectional power for varying the rate of charge of the batteries.

The above and other objects and advantages of the present invention will appear more fully hereinafter in consideration of the detailed description which follows taken together with the accompanying drawing wherein one embodiment of the invention is illustrated.

In the drawings:

FIG. 1 is a simplified schematic illustration of a rechargeable battery operated electric dry shaver and a charging stand for supplying unidirectional power for recharging the batteries of the shaver;

FIG. 2 is a schematic illustration of a power cord for use with the shaver and charging stand of FIG. 1;

FIG. 3 is a simplified schematic wiring diagram of the shaver operating and charging circuits.

Figure 4:
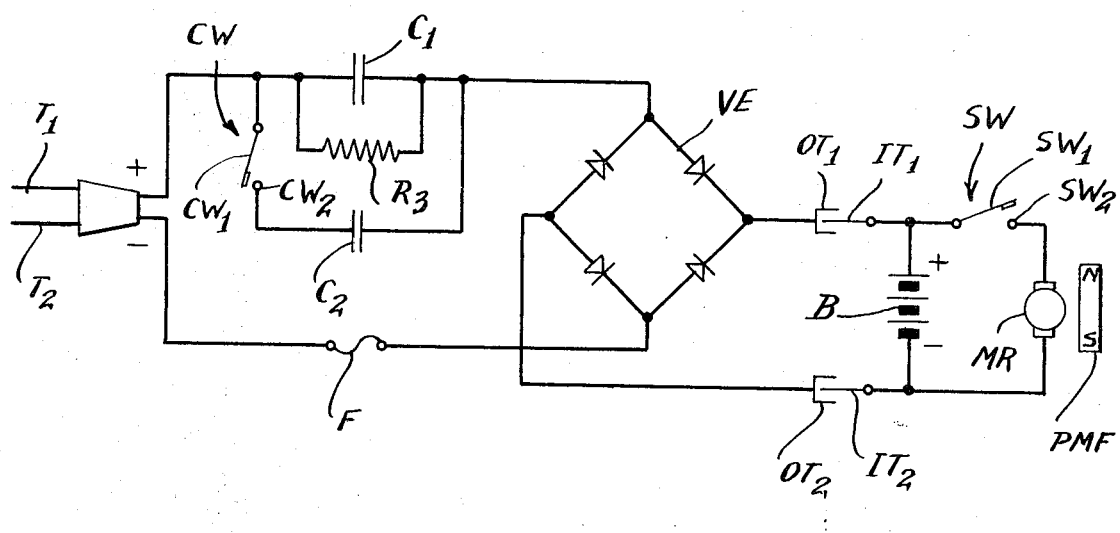
FIG. 4 is a simplified schematic wiring diagram of a modified embodiment of the shaver operating and charging circuits of FIG. 3.

Referring now to the drawing for a more detailed description of the present invention, a rechargeable battery operated shaver and a charging stand for replenishing the power supply of the batteries are generally indicated respectively by the reference numerals 10 and 11 in FIG. 1 and indicate by way of example an electrical appliance which incorporates the present invention. It being understood that the invention is not limited to an electric dry shaver and is applicable to similar rechargeable battery operated electrical appliances without departing from the spirit or the scope thereof.

Shaver 10 (FIG. 1) is of a usual type and includes a casing 13 in which are arranged a cutter head assembly 14 operable by a direct current driving motor M. A pair of rechargeable batteries B are disposed in casing 13 for energizing motor M and a manual switch KS is provided for opening and closing a circuit between batteries B and motor M. Shaver 10 is also provided with recessed male prong input terminals ST1, ST2 and ST3.

In the circuit of FIG. 3 MR designates the motor rotor of driving motor M and PMF designates the permanent magnet field thereof. Switch KS has two stationary contacts KS1 and KS2 and a movable contact KS3. Contact KS3 being manually actuatable from a normally open mid-position into engagement with either of stationary contacts KS1 or KS2. One terminal of motor rotor MR is connected to the negative terminal (—) of the series connected rechargeable batteries B. The other terminal of the motor rotor MR is connected to movable contact KS3 of switch KS. Positive terminal (+) of batteries B is connected to stationary contact KS2 of switch KS and stationary contact KS1 is connected to input terminal ST1.

As seen in FIG. 1 charger 11 includes a casing 15 in which are arranged a full wave rectifier RE, a lamp L and a manually actuatable switch KSC. A power cord 16 is provided in charger casing 15 and includes a plug provided with prong input terminals T1 and T2 adapted for connection to a standard household AC power outlet. In addition output socket terminals CT1, CT2, and CT3 are provided on casing 15 for connection with shaver input terminals ST1, ST2 and ST3 in a manner to be hereinafter described. It may be noted that socket output terminals CT1, CT2, and CT3 and input terminals ST1, ST2, and ST3 are of a nonsymmetrical type to insure the shaver 10 is properly connected to charger 11 when desired.

The electrical components of charge 11 are interconnected in the manner shown in the circuit of FIG. 3. Transformer TR of charger 11 (FIG. 3) is provided with a primary winding TRP and a secondary winding TRS. Primary winding TRP is connected to charger input terminal T2 and through a fuse F to input terminal T1. Secondary winding TRS of transformer TR is connected to full-wave rectifier RE and through a mid-tap over conductor 40 to output terminal CT3. Rectifier RE is connected to output terminals CT1 and CT2 over conductors 20 and 30 respectively. When energized transformer TR applies alternating power at a predetermined proper magnitude to the input of rectifier RE which converts the power to pulsating direct power. The rectified output is adapted to be applied to either output terminals CT2 and CT3 over conductors 30 and 40 for recharging batteries B; or over conductors 20 and 40 to output terminals CT1 and CT3 for operation of motor rotor MR independently of batteries B in a manner to be described.

As mentioned it is a feature of the present invention to provide novel means for selectively varying the magnitude of the unidirectional power applied at the output of charger means at output terminals CT2 and CT3 for recharging batteries B. To this end control means are provided in charger 11 which include the manual switch KSC (FIG. 1) having two stationary contacts KSC1 and KSC2 (FIG. 3) and a movable contact arm. First resistance means including voltage dropping resistor R1 is connected to contact KSC1 and output terminal CT2. A second resistance means which comprises lamp L is connected in series with switch contact KSC2 and output terminal CT2 in parallel to resistor R1. A resistor R2 is connected in shunting relationship over lamp L.

In FIG. 2 is shown a flexible two conductor power cord PC. Power cord PC is provided at one end with a female plug PF having socket terminals PF1 and PF2 adapted for connection to input terminals ST1 and ST3 of shaver 10. A male plug PM having prong terminals PM1 and PM2 for connection to charger output socket terminals CT1 and CT3 is provided at the opposite end of cord PC. Plugs PF and PM are electrically interconnected through two conductors in power cord PC.

In accordance with the described arrangement, assume that it is desired to operate shaver 10 (FIG. 1) from the self-contained rechargeable batteries B under condition where shaver 10 is disconnected from charger stand 11. To accomplish this switch KS (FIG. 3) is actuated to a position to close movable contact KS3 with stationary contact KS2 thereby connecting batteries B (FIG. 3) across motor rotor MR to energize shaver motor M (FIG. 1) for operation of cutter head assembly 14.

Next assume it is desired to operate shaver 10 independently of batteries B. Under these conditions power cord PC (FIG. 2) is interconnected between shaver 10 and charger stand 11 by connecting socket terminals PF1 and PF2 of female plug PF to prong input terminals ST1 and ST3 of shaver 10 and connecting prongs PM1 and PM2 of male plug PM to socket output terminals CT1 and CT3 of charger 11. Power cord 16 of charger stand 11 is connected to an external AC household outlet which applies alternating power at 110 volts at charger input prong terminals T1 and T2. The alternating power is applied through transformer TR to the input of rectifier RE with transformer TR acting to limit the current applied to rectifier RE. Under these conditions rectifier RE converts the power to pulsating direct current power of relatively low voltage over conductors 20 and 40 to output terminals CT1 and CT3 (FIG. 3) of charger 11. With manual switch KS of shaver 10 actuated to close movable contact KS3 and stationary contact KS1, the motor rotor MR is connected directly across the output of rectifier RE through conductors 20 and 40, power cord PC, and shaver input terminals ST1, ST3 for energization of motor rotor MR independently of batteries B.

Next assume it is desired to recharge batteries B from the external alternating power source. To accomplish this, power cord PC is disconnected from shaver 10 and charger 11 and switch KS of shaver 10 is actuated to normal open condition. Shaver 10 is then placed on charger stand 11 and shaver input prongs ST1, ST2 and ST3 are plugged into charger output socket terminals CT1, CT2, CT3. With charger stand 11 connected to the source of alternating current, as previously described, the rectified output of rectifier RE is applied over resistor R1 and over conductors 30 and 40 to charger output terminals CT2 and CT3 with resistor R1 reducing the magnitude of applied direct power to a first perdetermined level. It is to be noted that with switch KS of shaver 10 in an open condition current is not applied over conductor 20. In this manner a charging circuit is established from rectifier RE over conductors 30 and 40 and connected terminals CT2–ST2 and CT3–CT3 to batteries B. Resistor R1 being of a selected ohmic value to effectively limit the charging of batteries B to a predetermined rate whereby the batteries B may be left on charge in the described mode indefinitely.

Next assume that it is desired to operate shaver 10 from batteries B and it is found that the batteries B have insufficient power or charge to operate motor M and require a recharge sufficient at least for one shave. Under these conditions with shaver 10 in plugged in connection with charger stand 11 as above described for the previous charging condition, switch KSC (FIG. 3) of charger 11 is actuated to a closed condition closing contacts KSC1 and KSC2 (FIG. 3). With switch KSC in closed condition lamp L resistance and resistor R2 are placed in parallel with voltage dropping resistor R1. As a result of the parallel connection of lamp L and resistor R2 with resistor R1 the total resistance over conductor 30 is reduced. Lamp L and resistor R2 being of preselected ohmic values to thereby in parallel connection with resistor R1 effect an increase in the magnitude of applied direct current at charger output terminals CT2 and CT3 whereby the rate of charge of batteries B is increased to a predetermined level. Under these conditions the power supply of batteries B are replenished within a shorter period of time then under the previously described battery charging mode. In this manner the batteries B may be charged more rapidly to a selected level sufficient to permit operation of shaver motor M through the battery-motor circuit to complete at least one shave when shaver 10 is disconnected from charger 11. It will be noted that during this battery charging condition lamp L is in lit condition to thereby provide a visual indication to a user that the rate of charge has been increased.

In FIG. 4 another embodiment of the present invention is disclosed. In this embodiment the electrical components of the shaver operating circuit comprise motor rotor MR, permanent magnet PMF, rechargeable batteries B and input terminals IT1 and IT2. A switch SW having a movable contact SW1 and a stationary contact SW2 is provided with the positive terminal (+) of batteries B connected to movable contact SW1 and one terminal of motor rotor MR connected to stationary contact SW2. The other terminal of motor rotor MR is connected to the negative terminal (−) of the series connected batteries B.

In FIG. 4 the electrical components of the charging circuit include input terminals T1–T2, a fuse F and a full-wave bridge-type rectifier VE for converting applied alternating power to unidirectional power at output terminals OT1 and OT2. A current limiting capacitor C1 is electrically interposed between the input of rectifier RE across input terminal T1. A resistor R3 is shunted across capacitor C1 and which capacitor C1 together with resistor R3 are of selected values for reducing the alternating power applied to rectifier VE to a preselected level from a source external to the charging unit such as from the usual household AC outlet.

Means for selectively varying the magnitude of the alternating power applied to the rectifier VE and thus the unidirectional power applied at the output terminals OT1 and OT2 are provided. To this end a manually operated switch CW having a movable contact CW1 is electrically interposed between input terminal T1 and rectifier VE and a stationary contact CW2. A second resistance means comprising a capacitor C2 is connected across stationary switch contact CW2 of switch CW in parallel with capacitor C1.

In accordance with this described arrangement if it is assumed that it is desired to recharge batteries B from an alternating power source terminals T1 and T2 are connected to the source and input and output terminals IT1 and IT2 of the shaver operating circuit are connected to output terminals OT1 and OT2 of the charging circuit. In this manner a charging circuit is established from input terminals T1–T2 across current limiting capacitor C1, rectifier VE which applies unidirectional power at a predetermined rate to the output terminals of the charging circuit for charging batteries B.

Next assume that it is desired to increase the rate of charge of batteries B. Under these conditions switch CW is actuated to close contacts CW1 and CW2 whereby capacitor C2 is placed in parallel connection with capacitor C1 and resistor R3. As a result the total resistance to alternating current applied over rectifier VE is reduced. Capacitor C1 and resistor R3 being of a preselected ohmic value to thereby in parallel connection with capacitor C2 in closed position of switch CW effect an increase in the magnitude of applied current at the input of rectifier VE to increase the rate of recharge of the batteries B whereby the power supply of batteries B is replenished within a shorter period of time as preselected. As will be apparent if it is desired to operate the shaver input terminals IT1–IT2 are first disconnected from charger output terminals OT1–OT2. Switch SW is operated to close contact SW1–SW2 and establish a circuit from batteries B to motor rotor MR.

It will be apparent from the foregoing description that the novel charging means has many advantages in use. One advantage among others is that compact and economical means are provided for selectively varying the magnitude of applied current at the output of the charger 11 in accordance with the preselected ohmic values of resistor R1 and lamp L (FIGS. 1 to 3) or capacitors C1 and C2, resistor R3 (FIG. 4) whereby the rate of charge of batteries B may be selectively varied.

Another advantage is that novel means are provided for increasing the rate of charge whereby the batteries B may be more rapidly charged as selected to provide sufficient power to operate shaver 10 therefrom to complete one shave. The utilization of the resistance lamp L (FIGS. 1 to 3) when in parallel connection with resistor R1 to increase the rate of charge having the further advantages of providing visual indication means that both the increased rate of charge is in effect and that the charging circuit is closed.

It is to be expressly understood that the invention is not limited to the embodiments illustrated and described in detail hereinabove. Various changes can be made in the design and arrangement of elements without departing from the spirit and scope of the invention as the same will now be unerstood by those skilled in the art.

What is claimed is:

1. In an electrical appliance,
   (a) a driving motor,
   (b) a replenishable power supply including at least one rechargeable battery for supplying power to said motor.
   (c) first switch means operable for connecting and disconnecting said battery to said motor,
   (d) means for replenishing the power supply of said battery including power converting means adapted for connection to an external source of alternating power for converting said alternating power to unidirectional power when said first switch means is operated to disconnect said battery from said motor,
   (e) said battery including input means for receiving said unidirectional power supply,
   (f) said power replenishing means further including first and second impedance means arranged in parallel and interposed between said alternating power source and said replenishable power supply for limiting the magnitude of unidirectional power applied to said battery, and
   (g) control means for selectively changing the magnitude of unidirectional power and comprising second switch means interposed between said first impedance means and said alternating power source and operable to a normally open position and a closed position,
   (h) said second switch means in the normally open position interrupting the parallel connection of said first and second impedances to isolate the first impedance from said power converting means whereby the unidirectional power to said input means is applied through the second impedance at a first predetermined level,
   (i) said second switch in the closed position placing said first and second impedance means in parallel to increase the unidirectional power applied to said input means to a second predetermined level.

2. The appliance of claim 1 wherein said second switch means includes a movable contact and a pair of stationary contacts interposed between said second impedance means and said alternating power source.

3. The appliance of claim 1, wherein said first impedance means includes a voltage dropping capacitor and shunting resistor connected to the input of said power converting means and wherein said second impedance means comprises a capacitor connected to said second switch means and isolated from said first capacitor and power converting means in the open position of said switch.

4. The appliance of claim 1 wherein said first impedance means includes a voltage dropping resistor permanently connected to said power converting means, and wherein said second impedance means comprises a lamp connected to said second switch, said lamp being isolated from said power converting means in the open position of said second switch.

5. The appliance of claim 1 wherein said motor, the first switch means, and the battery are housed in a first casing, and wherein said power converting means, second switch means and said first and second impedance means are housed in a second casing, said battery input means including input terminals in said first casing and output terminals on said casing adapted for mating engagement when said battery is to be charged whereby said first switch means disconnects said driving motor from said power converting means.

References Cited
UNITED STATES PATENTS

| | | | |
|---|---|---|---|
| 3,108,192 | 10/1963 | Reich | 320—2 X |
| 3,214,670 | 10/1965 | Schaf | 320—22 X |
| 3,316,417 | 4/1967 | Tolmie | 320—2 X |
| 3,340,454 | 9/1967 | Dahl | 320—22 |
| 3,447,058 | 5/1969 | Stahly et al. | 320—2 |

J D MILLER, Primary Examiner

J. M. GUNTHER, Assistant Examiner

U.S. Cl. X.R.

320—2, 9